Oct. 19, 1965 E. GRANBERG 3,212,253
ANVIL ASSEMBLY FOR SERVICING SAW CHAINS AND THE LIKE
Filed Jan. 20, 1964 3 Sheets-Sheet 1
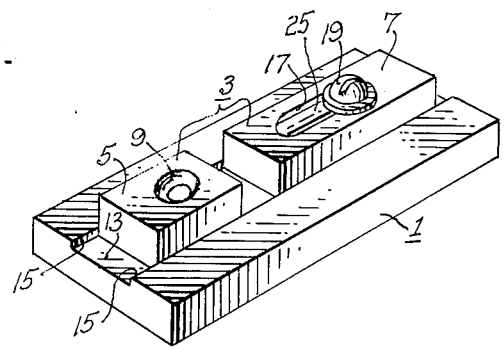
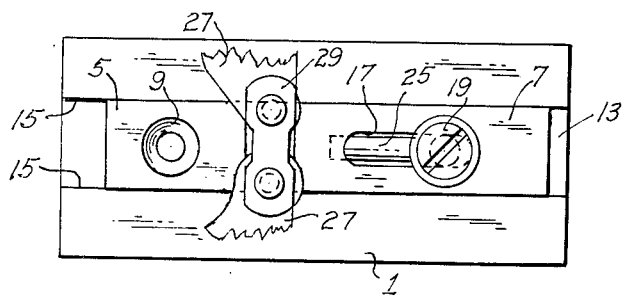
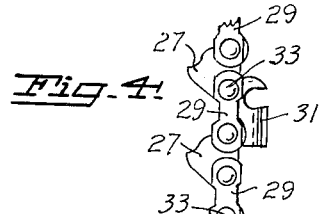
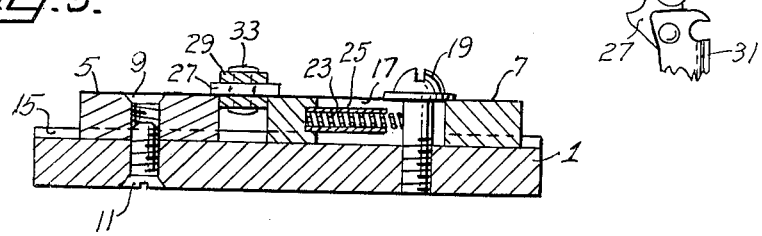
INVENTOR.
ELOF GRANBERG
BY Bruce & Brosler
HIS ATTORNEYS Oct. 19, 1965        E. GRANBERG        3,212,253
ANVIL ASSEMBLY FOR SERVICING SAW CHAINS AND THE LIKE
Filed Jan. 20, 1964        3 Sheets-Sheet 2
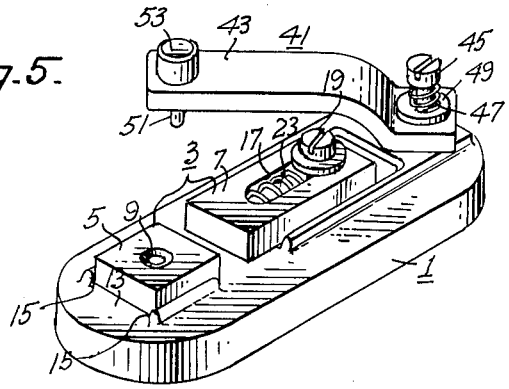
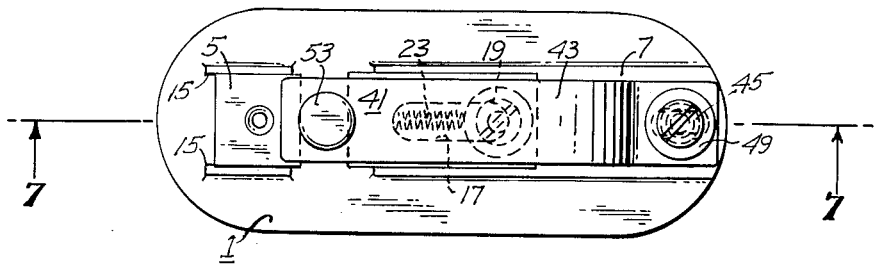
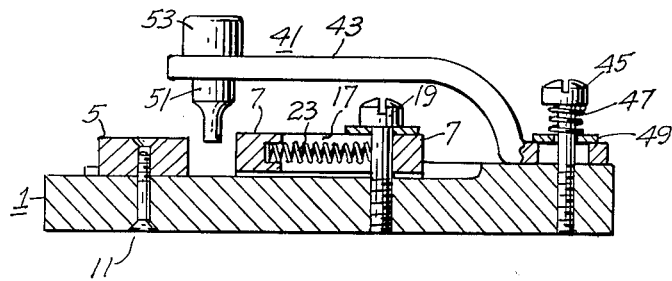
INVENTOR.
ELOF GRANBERG
BY
Bruce + Brosler
HIS ATTORNEYS Oct. 19, 1965          E. GRANBERG          3,212,253

ANVIL ASSEMBLY FOR SERVICING SAW CHAINS AND THE LIKE

Filed Jan. 20, 1964          3 Sheets-Sheet 3

INVENTOR.
ELOF GRANBERG
BY
Bruce & Brosler
ATTORNEYS ial No. 303,470, filed August 15,

United States Patent Office
3,212,253
Patented Oct. 19, 1965

3,212,253
ANVIL ASSEMBLY FOR SERVICING SAW
CHAINS AND THE LIKE
Elof Granberg, 2659 Mira Vista Drive, Richmond, Calif.
Filed Jan. 20, 1964, Ser. No. 342,328
16 Claims. (Cl. 59—7)

This application is a continuation-in-part of my application of same title, Serial No. 303,470, filed August 15, 1963, now abandoned, the aforementioned application being a continuation-in-part of my application of same title, Serial No. 257,253, filed February 8, 1963, and since abandoned.

My invention relates to chain saws and more particularly to tools for use in the servicing of the chains of such saws and items of like character.

In the use of chain saws, it frequently happens that a cutting tooth or other component part of the chain becomes damaged to the extent of either necessitating replacing the damaged link or buying a new saw chain. The cost of repairing a chain represents but an insignificant part of the cost of a new chain and is, therefore, the more economical solution to the problem.

A chain saw is made up of drive links, cutter teeth and tie straps, freely held together by rivets. To service a chain, therefore, requires first breaking it as by removing a rivet or two to eliminate faulty or damaged cutter tooth or drive link, and following replacement of a new one, then spinning new rivets or sometimes the old rivets into position.

While certain tools have been developed for this purpose, they are rather expensive and therefore either beyond the ability of a saw chain owner to purchase, or the limited need he might have for such a tool would, in his opinion, not warrant the outlay of money necessary to obtain one.

Among the objects of the present invention are:

(1) To provide a novel and an improved anvil assembly for use in servicing of saw chains and the like;

(2) To provide a novel and improved anvil assembly for such use, which will be well within the ability of any chain saw owner to purchase;

(3) To provide a novel and improved adjustable anvil assembly in which the anvil assembly adjusts itself to the work;

(4) To provide a novel and improved anvil assembly for use in servicing of saw chains and the like, in which assembly, a rivet punch serves to stabilize the work;

(5) To provide a novel and improved adjustable anvil assembly for use in servicing saw chains, which assembly is extremely simple in structure and can be produced quite economically.

Additional objects of my invention will be brought out in the following description of a preferred embodiment of the same, taken in conjunction with the accompanying drawings wherein:

FIGURE 1 is a three-dimensional view of an anvil assembly of the present invention;

FIGURE 2 is a plan view of the assembly of FIGURE 1;

FIGURE 3 is a view in section, taken longitudinally of the assembly of FIGURE 1;

FIGURE 4 is a view depicting a few links of a saw chain for the servicing of which, the anvil assembly of the present invention has been developed; and FIGURE 5 is a three-dimensional view of an anvil assembly of the present invention inclusive of a rivet punch assembly.

FIGURES 6 and 7, are, respectively, a plan view of the device of FIGURE 5, and a view in section taken in the plane 7—7 of FIGURE 6.

Figure 8:
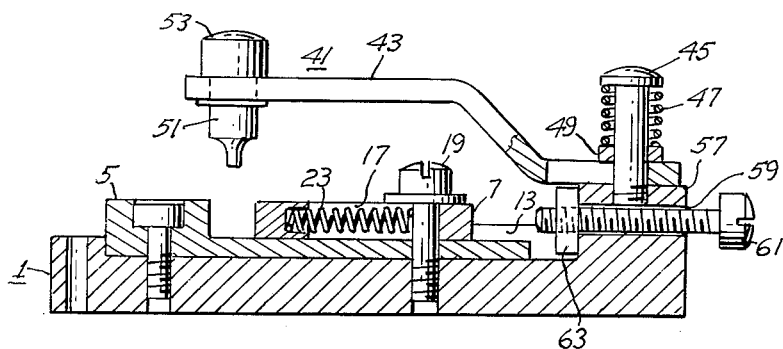
FIGURE 8 is a longitudinal view in section through a different embodiment of the invention of FIGURE 7.

Referring to the drawings for details of my invention in its preferred form, the same comprises a base 1 and an anvil 3 including a first anvil component 5 and a second anvil component 7, each of which anvil components is preferably of rectangular block form to provide sharp 90° edges. Other block shapes which present multiple sharp edges may be utilized.

The first anvil component is preferably provided with a spherical-surfaced recess 9 in a side thereof and this component is mounted on the base, with the recessed side facing upwardly. Such mounting may be readily accomplished by means of a screw 11 through the bottom of the base and threadedly engaging the first anvil component in its proper location on the base. In such position, this component is restrained against angular shift by the clamping effect of the mounting screw, and for greater assurance against such turning, some additional restraining means may be provided as by snugly fitting the anvil component into a groove 13 in the base to provide opposing restraining walls 15.

The second anvil component 7 is preferably of longer dimension than the first component and is formed with a longitudinal slot 17 therein, permitting this component to be mounted on the base for limited adjustable movement in anvil relationship to the first component.

In mounting this second component on the base, a screw 19 passes downwardly through the slot and threadedly engages the base without tightly clamping the anvil component. When so mounted, this component is capable of limited shifting within the limits permitted by the slot, but additional means must be provided to assure that this component will be maintained in proper anvil relationship to the first component, and such means may be a continuation of the groove 13 into which the second component is set, and in which it will be guided by the opposing walls of the groove, with one of its sharp edges in paralleled relationship to a sharp edge of the first anvil component.

A compression spring 23 is placed under compression in the slot 17, between the mounting screw and the slot end closest to the first anvil component, to resiliently urge this second anvil component toward the first anvil component. The extent of such movement in the direction of the first anvil component is of course limited by the remote end of the slot and the location of the mounting screw 19. These are so determined that minimum spacing between the two anvil components will normally exist, which will be slightly less than the minimum size of chain link element to be grasped between such components.

The maximum spacing between anvil components will be determined by the compressibility of the spring, but I prefer to house one end of the spring in a sleeve 25 to act as a stop before full compressibility of the spring can take place, and this will be taken into consideration in determining the maximum spacing obtainable between the components of the anvil.

Inasmuch as the anvil assembly of the present invention has been developed primarily for use in servicing of saw chains, it might be well at this point, to briefly describe the make-up of such a saw chain and the manner in which the anvil assembly of the present invention may be employed in the servicing of such chain.

Referring to FIGURE 4, such a chain will, in general, include equally-spaced drive links 27 coupled together on both sides by tie straps 29 except where cutter teeth 31 are to be located and at such locations, only one tie strap appears, the other side of the drive links being coupled by the cutting link. Rivets 33 hold these various elements of the chain together, the rivets in most chains being shoulder rivets, against the shoulders of which the drive links and the tie straps are held by the rivet heads.

In employing the anvil assembly of the present invention to the servicing of such a chain, a tie strap, at the point to be serviced, is urged against the spring-biased component of the anvil until the tie strap drops between the two anvil components and is automatically gripped between the two. In such position, the overhanging portions of the adjacent drive links of the chain will rest on the surfaces of the anvil components, whereupon a punch or equivalent tool may be placed upon the rivet to be removed, and with a blow or two of a hammer against the punch, such rivet may be knocked out.

It is important to note in this connection, that in a saw chain, the overhanging portions of the drive links at certain of the corners of the tie strap, are very meager, which, to assure a sound support for the chain on the anvil surfaces, requires that the opposing corners of the anvil be quite sharp. Otherwise, the blow of the hammer, as transmitted to the chain through the punch, may deflect the chain sufficiently to cause the same to slip from its support on the anvil. To minimize wear of these edges, the anvil components are preferably case hardened.

A feature of the present invention, lies in the block form of the anvil components, because, being removably secured to the base, each is capable of being removed and re-oriented so as to present any one of at least four sharp edges to the opposing anvil component. In the event, after a period of use, the prevailing edge of an anvil component has become unsuited for its purpose, such component may be re-oriented to present a fresh edge, and thereby extend the life expectancy of the device.

Upon removal of the necessary rivet or rivets and the damaged link element, a new element and rivets are assembled, and the chain is shifted, to position such assembled rivet with its head in the recess formed in the upper side of the first anvil component. The exposed end of the rivet can then be repeatedly tapped with a hammer or other suitable tool to spread the same and form a head. Any additional rivets necessary to complete the service operation will be similarly treated.

Should it be contemplated that the first anvil component will be turned over at some time or other, to make use of all of its sharp edges, to extend the life of the anvil assembly, a similar recess can be formed on the opposite side, and provision made on the upper side for receiving the mounting screw upon so reversing this component.

This could be simplified by making the recess for the rivet head and the recess for the screw head, similar as depicted in FIG. 3 so that each can serve a dual purpose.

The anvil assembly of FIGURE 5 is like that of FIGURE 1, with an added feature in the form of a punch assembly 41.

This punch assembly includes a cantilever type arm 43, which is freely anchored at one end about a stud 45 rising from the base adjacent an end of the base, the arm being provided with a slot for this purpose so as to allow of some shifting adjustment of the arm at its anchored end.

The arm extends longitudinally up and over the adjustable anvil component 7, and terminates over the space between the anvil components.

A coil spring 47 about the stud and under compression between the head of the stud and the proximate end of the arm serves to resiliently anchor the arm while permitting such shifting adjustment as well as movement of the arm in both vertical and horizontal planes. A washer 49 between the spring and the proximate end of the arm will assure more efficient functioning in the permissible movements of the arm.

At the free end of the arm, a punch 51 is installed. This will preferably be one passing through the free end of the arm and having a head 53 resting against the upper side of the arm.

Normally the height of the arm at its free end, and the length of the punch will preferably, though not necessarily, be such as to cause the punch to extend into the gap between the anvil components and necessitate lifting the same to permit of placement of the punch against a rivet in a saw chain disposed on the anvil components, in position to be serviced.

When so placed, the spring 47 will cause the punch to bear against the rivet and stabilize the chain. A sharp blow against the head of the punch will drive the rivet out, following which the punch arm may be raised sufficiently to swing the punch out of the way and free the chain for removal from the anvil assembly or shifted to a new position for removal of a second rivet if desired.

The permissible shifting adjustment of the arm, attributable to the slot opening in the anchored end of the arm, allows for adjusting the rivet punch to the location of a rivet to be punched, which location, of course, will vary slightly for saw chains of different sizes and construction.

In the manufacture of some chains, and due to wear in others, the extent to which the drive links overhang the tie straps is so slight that the impact of the rivet punch against a rivet head, may cause a slipping of the chain from its anvil support, such slipping being facilitated by reaction of the spring 23 to such impact. The embodiment of FIGURE 8 incorporates a feature adapted to effect a firm grip on the chain and prevent spring reaction, to thereby discourage such slipping.

With this in mind, the base 1 is preferably enlarged sufficiently in height at the cantilever mounted end, to form a boss 57 through which is provided a passageway 59 in alignment with the second or adjustable anvil component 7. A machine screw 61 slidably passing through this passageway, carries a nut 63 on its inner end and of a size to fit into the groove 13 to preclude rotatability thereof. The nut is preferably restrained against longitudinal movement to any appreciable extent, and the screw being of sufficient length to reach the adjustable anvil section 7 in any of its adjustable positions, it is threaded into engagement with said anvil section following installation of a chain on the anvil for servicing, to pressure lock the anvil component 7 against retraction, thus assuring maintained support for the chain when impacted by the rivet punch.

With such locking feature incorporated into the anvil assembly, the spring 23, though highly desirable, may be dispensed with, if one is willing to initially manipulate the adjustable anvil component by hand, when installing the chain to be serviced and prior to effecting locking of the adjustable anvil component by the screw 61.

It will be apparent from the foregoing description of my invention that it fulfills all the objects attributed thereto, and while I have illustrated and described the same in considerable detail, I do not desire to be limited in my protection to the details so illustrated and described, except as may be necessitated by the appended claims.

I claim:

1. An anvil assembly for the servicing of saw chains of differing size comprising a base, an anvil including a first anvil component and a second anvil component, means for mounting said first anvil component on said base, means for mounting said second anvil component for limited adjustable movement in anvil relationship to said first anvil component, said means including, guide means on said base, adapted to receive said second anvil component for sliding movement toward and away from said first component, and spring means resiliently urging said second anvil component toward said first component, and means for locking said second anvil component against movement in a direction away from said first component following installation of a saw chain on said anvil.

2. An anvil assembly for the servicing of saw chains of differing size comprising
a base,
an anvil including a first anvil component and a second anvil component,
said second anvil component having a slot therein,
means for mounting said first anvil component on said base,
means for mounting said second anvil component for limited adjustable movement in anvil relationship to said first anvil component, said means including,
guide means on said base, adapted to receive said second anvil component for sliding movement toward and away from said first component,
means passing through said slot and engaging said base to hold said second anvil component to said base,
a compression spring under compression in said slot between said second anvil component holding means and the slot end closest to said first anvil component, to resiliently urge said second anvil component toward said first component.

3. An anvil assembly for the servicing of saw chains of differing size comprising
a base,
an anvil including a first anvil component and a second anvil component,
said first anvil component having a recess in a side thereof,
each of said anvil components being of rectangular block form to provide at least four sharp edges for anvil use when properly orientated,
means for mounting said first anvil component on said base with said recessed side up,
means for mounting said second anvil component for limited adjustable movement in anvil relationship to said first anvil component, said means including
guide means on said base, adapted to receive said second anvil component for sliding movement toward and away from said first component, with one of the sharp edges of said second component in parallel relationship to a sharp edge of said first anvil component, and
spring means resiliently urging said second anvil component toward said first component.

4. An anvil assembly for the servicing of saw chains of differing size comprising
a base,
an anvil including a first anvil component and a second anvil component,
said first anvil component having a spherical-surfaced recess in a side thereof,
said second anvil component having a slot therein,
each of said anvil components being of block form to provide at least four sharp edges,
means for mounting said first anvil component on said base with said recessed side up,
said means including a screw through the bottom of said base and threadedly engaging said first anvil component,
means for mounting said second anvil component for limited adjustable movement in anvil relationship to said first anvil component, said means including
guide means on said base, adapted to receive said second anvil component for sliding movement toward and away from said first component, with one of the sharp edges of said second anvil component in parallel relationship to a sharp edge of said first anvil component,
a screw through said slot and threadedly engaging said base, and
a compression spring under compression in said slot between said screw and the slot end closest to said first anvil component, to resiliently urge said second anvil component toward said first component.

5. An anvil assembly for the servicing of saw chains of differing size comprising
a base,
an anvil including a first anvil component and a second anvil component,
said first anvil component having a spherical-surfaced recess in a side thereof;
said second anvil component having a slot therein,
each of said anvil components being of rectangular block form to provide at least four sharp edges,
means for mounting said first anvil component on said base with said recessed side up,
said means including a screw through the bottom of said base and threadedly engaging said first anvil component;
means restraining said first anvil component against angular shift when so mounted,
means for mounting said second anvil component for limited adjustable movement in anvil relationship to said first anvil component, said means including
guide means on said base, adapted to receive said second anvil component for sliding movement toward and away from said first component, with one of the sharp edges of said second anvil component in parallel relationship to a sharp edge of said first anvil component,
a screw through said slot and threadedly engaging said base,
a compression spring under compression in said slot between said screw and the slot end closest to said first anvil component, to resiliently urge said second anvil component toward said first component,
means for retaining said spring in said slot, and
means for restricting the compressive range of said spring to limit the adjustability of said anvil assembly to a range adequate to service the available range of sizes of saw chains.

6. An anvil assembly for servicing of saw chains comprising
a base,
an anvil including a first anvil component and a second anvil component,
means mounting said anvil components on said base in spaced relationship to each other to create a gap such as to permit of placement of a chain link on said components across said gap in position to punch out a rivet from such link,
a rivet punch having a rivet engaging end,
and resilient cantilever means supporting said rivet punch over said gap,
and including means adjustably anchoring said cantilever means to permit adjustable displacement of said cantilever means for aligning said punch with rivets in saw chains of different sizes.

7. An anvil assembly for servicing of saw chains comprising
a base,
an anvil including a first anvil component and a second anvil component,
means mounting said anvil components on said base in spaced relationship to each other to create a gap such as to permit of placement of a chain link on said components across said gap in position to punch out a rivet from such link,
a rivet punch having a rivet engaging end,
and resilient means supporting said rivet punch over said gap with its rivet engaging end normally extending into said gap, said supporting means including
a cantilever arm,
said cantilever arm, at one end, being anchored to said base and terminating over said gap, with said punch being installed at the free end of said arm and normally extending sufficiently into said gap to engage a saw chain when disposed on said anvil.

8. An anvil assembly for servicing of saw chains comprising
a base,
an anvil including a first anvil component and a second anvil component,
means for mounting said anvil components on said base in spaced relationship to each other to create a gap such as to permit of placement of a chain link on said components across said gap in position to punch out a rivet from such link,
a rivet punch having a rivet engaging end,
and means resiliently supporting said rivet punch over said gap with its rivet engaging end normally extending into said gap, said resilient supporting means including
a cantilever arm,
a stud rising from said base adjacent an end thereof and terminating in a head,
said cantilever arm, at one end, being freely anchored about said stud by a coil spring about said stud and under compression between said stud head and the proximate end of said arm, to permit movement of said arm in both vertical and horizontal planes,
said arm extending longitudinally up and over one of said anvil components and terminating over said gap, and said punch being installed at the free end of said arm with its rivet engaging end extending below said arm and into said gap.

9. An anvil assembly for servicing of saw chains comprising
a base,
an anvil including a first anvil component and a second anvil component,
means for mounting said anvil components on said base in spaced relationship to each other to create a gap such as to permit of placement of a chain link on said components across said gap in position to punch out a rivet from such link,
a rivet punch having a head and a rivet engaging end,
and means resiliently supporting said rivet punch over said gap with its rivet engaging end normally extending into said gap, said resilient supporting means including
a cantilever arm,
a stud rising from said base adjacent an end thereof and terminating in a head,
said cantilever arm at one end having a slot through which said stud passes, to permit shifting adjustment of said arm, and a coil spring about said stud and under compression between said stud head and the proximate end of said arm, to permit movement of said arm in both vertical and horizontal planes,
said arm extending longitudinally up and over one of said anvil components and terminating over said gap, and said punch being installed at the free end of said arm with its head above said arm and its rivet engaging and extending below said arm and into said gap.

10. An anvil assembly for the servicing of saw chains comprising
a base,
an anvil including a first anvil component and a second anvil component,
means for mountnig said first anvil component on said base,
means for mounting said second anvil component for limited adjustable movement in anvil relationship to said first anvil component to create a gap between said components, said means including,
guide means on said base, adapted to receive said second anvil component for sliding movement toward and away from said first component, and
spring means resiliently urging said second anvil component toward said first component,
a rivet punch,
and resilient cantilever means supporting said rivet punch over said gap.

11. An anvil assembly for the servicing of saw chains comprising
a base,
an anvil including a first anvil component and a second anvil component,
said second anvil component having a slot therein,
means for mounting said first anvil component on said base,
means for mounting said second anvil component for limited adjustable movement in anvil relationship to said first anvil component to create a gap between said components, said means including,
guide means on said base, adapted to receive said second anvil component for sliding movement toward and away from said first component,
means passing through said slot and engaging said base to hold said second anvil component to said base,
a compression spring under compression in said slot between said second anvil component holding means and the slot end closest to said first anvil component, to resiliently urge said second anvil component toward said first component,
a rivet punch,
and means resiliently supporting said rivet punch over said gap with said punch extending downwardly into said gap.

12. An anvil assembly for the servicing of saw chains of differing size comprising
a base,
an anvil including a first anvil component and a second anvil component,
means for mounting said first anvil component on said base,
means for mounting said second anvil component for limited adjustable movement in anvil relationship to said first anvil component,
spring means resiliently urging said second anvil component toward said first component,
and independent means for locking said second anvil component against movement in a direction away from said first component following installation of a saw chain on said anvil for servicing.

13. An anvil assembly for the servicing of saw chains of differing size comprising
a base,
an anvil including a first anvil component and a second anvil component,
means for mounting said first anvil component on said base,
means for mounting said second anvil component for limited adjustable movement in anvil relationship to said first anvil component,
and independent means for locking said second anvil component following installation of a saw chain on said anvil and adjustment of said second anvil component thereto, to prepare such chain for servicing, said locking means including
a boss on said base and having a passageway therethrough in alignment with said second anvil component, and
a screw in said passageway and adjustable into engagement with said second anvil component in any adjustable position of said component.

14. An anvil assembly for the servicing of saw chains of differing size comprising
a base,
an anvil including a first anvil component and a second anvil component,
means for mounting said first anvil component on said base,
means for mounting said second anvil component for limited adjustable movement in anvil relationship to said first anvil component, spring means resiliently urging said second anvil component toward said first component,
and means for locking said second anvil component following installation of a saw chain on said anvil and adjustment of said second anvil component thereto, to prepare such chain for servicing, said locking means including
a boss on said base and having a passageway therethrough in alignment with said second anvil component, and
a screw in said passageway and adjustable into engagement with said second anvil component in any adjustable position of said component.

15. An anvil assembly for servicing of saw chains comprising
a base,
an anvil including a first anvil component and a second anvil component,
means for mounting said anvil components on said base in spaced relationship to each other to create a gap such as to permit of placement of a chain link on said components across said gap in position to punch out a rivet from such link,
a rivet punch having a rivet engaging end,
means supporting said rivet punch over said gap,
and means for locking said anvil components against enlargement of said gap, following installation of a saw chain on said anvil for servicing.

16. An anvil assembly for the servicing of saw chains comprising
a base,
an anvil including a first anvil component and a second anvil component,
means for mounting said first anvil component on said base,
means for mounting said second anvil component for limited adjustable movement in anvil relationship to said first anvil component to create a gap between said components, said means including,
guide means on said base, adapted to receive said second anvil component for sliding movement toward and away from said first component,
a rivet punch,
means resiliently supporting said rivet punch over said gap,
and means for locking said second anvil component against movement in a direciton away from said first anvil component, following installation of a saw chain on said anvil for servicing.

References Cited by the Examiner
UNITED STATES PATENTS

| | | | |
|---|---|---|---|
| 1,024,728 | 4/12 | Jackson | 81—4 |
| 1,130,121 | 3/15 | Thrasher | 78—46 |
| 1,208,092 | 12/16 | Carter | 59—7 |
| 1,518,709 | 12/24 | Thomas | 269—254 |
| 1,633,810 | 6/27 | Fellows | 269—254 |
| 1,997,674 | 4/35 | Borst | 78—46 |
| 2,207,892 | 7/40 | Mullaney | 59—7 |
| 2,471,103 | 5/49 | Franks | 269—254 |
| 3,063,236 | 11/62 | Cannon | 59—7 |

FOREIGN PATENTS 231,736   7/44   Switzerland.

WILLIAM J. STEPHENSON, *Primary Examiner.*